(12) United States Patent
Guidarelli et al.

(10) Patent No.: US 8,466,637 B2
(45) Date of Patent: Jun. 18, 2013

(54) METHODS FOR CONTROLLING ONE OR MORE POSITIONING ACTUATORS AND DEVICES THEREOF

(75) Inventors: Thomas Guidarelli, Farmington, NY (US); David A. Henderson, Farmington, NY (US)

(73) Assignee: New Scale Technologies, Inc., Victor, NY (US)

( * ) Notice: Subject to any disclaimer, the term of this patent is extended or adjusted under 35 U.S.C. 154(b) by 407 days.

(21) Appl. No.: 12/840,009

(22) Filed: Jul. 20, 2010

(65) Prior Publication Data

US 2012/0019185 A1  Jan. 26, 2012

(51) Int. Cl.
*H02N 2/00* (2006.01)

(52) U.S. Cl.
USPC ....... 318/118; 318/128; 310/311; 310/323.17

(58) Field of Classification Search
USPC ... 310/311, 323.17, 323.18, 323.21; 318/118, 318/128, 282, 286, 466, 461, 468
See application file for complete search history.

(56) References Cited

U.S. PATENT DOCUMENTS

| | | | |
|---|---|---|---|
| 6,242,093 B1 * | 6/2001 | Ferguson | 428/367 |
| 6,940,209 B2 | 9/2005 | Henderson | |
| 7,085,484 B2 * | 8/2006 | Hara | 396/55 |
| 7,102,270 B2 * | 9/2006 | Ito et al. | 310/317 |
| 7,791,247 B2 * | 9/2010 | Kikuchi et al. | 310/311 |
| 2006/0082253 A1 * | 4/2006 | Hara | 310/317 |
| 2008/0169725 A1 | 7/2008 | Yu et al. | |
| 2008/0297923 A1 | 12/2008 | Koc et al. | |
| 2009/0015949 A1 | 1/2009 | Matsuki | |
| 2009/0152984 A1 | 6/2009 | Yamada et al. | |
| 2009/0180202 A1 * | 7/2009 | Knoedgen | 359/824 |
| 2010/0013354 A1 | 1/2010 | Marth et al. | |
| 2010/0038996 A1 | 2/2010 | Xu et al. | |

OTHER PUBLICATIONS

International Search Report for International Patent Application No. PCT/US2011/044181 (Feb. 29, 2012).

* cited by examiner

*Primary Examiner* — Rina Duda
(74) *Attorney, Agent, or Firm* — LeClairRyan, a Professional Corporation (57) ABSTRACT

A method, computer readable medium, and apparatus for controlling a moveable element includes generating and providing with a control device one or more driving signals to one or more positioning actuators to move the moveable element towards a target position based on a target travel distance and a calibration value. The control device determines when a post-movement position of the moveable element is outside of a tolerance range of the target position. The control device recalibrates the calibration value when the post-movement position is determined to be outside of the tolerance range. The control device repeats the generating, the determining, and the recalibrating as open loop steps until the post-movement position is within the tolerance range or until a limit, if any, on attempts is reached.

21 Claims, 8 Drawing Sheets

| Distance to Target Position (Segment of the travel range) | PULSE COEFFICIENT (i.e., Pulses per Unit Distance; Pulses Per Micron(PPUM); Pulses per Encoder Count) | | | | | | | |
|---|---|---|---|---|---|---|---|---|
| | 0µ to < 8µm | | 8µ to < 16µm | | 16µ to < 32µm | | 32µ+ | |
| | Fwd | Rev | Fwd | Rev | Fwd | Rev | Fwd | Rev |
| < -160µm | 24.6 | 24.6 | 93.2 | 97.0 | 124.7 | 145.5 | 77.0 | 24.6 |
| -160µm to < -128µm | 18.5 | 49.3 | 97.0 | 788.3 | 61.6 | 130.1 | 71.6 | 73.9 |
| -128µm to < -96µm | 18.5 | 49.3 | 80.1 | 90.1 | 106.2 | 180.1 | 94.7 | 69.3 |
| -96µm to < -64µm | 18.5 | 49.3 | 83.1 | 788.3 | 61.6 | 256.4 | 40.0 | 77.8 |
| -64µm to < -32µm | 18.5 | 98.5 | 77.8 | 788.3 | 199.4 | 230.2 | 134.0 | 104.0 |
| -32µm to < 32µm | 18.5 | 37.0 | 177.1 | 274.9 | 61.6 | 146.3 | 48.5 | 87.8 |
| 32µm to < 64µm | 18.5 | 37.0 | 101.6 | 97.0 | 51.6 | 126.3 | 43.1 | 69.3 |
| 64µm to < 96µm | 24.6 | 24.6 | 83.1 | 135.5 | 68.5 | 68.5 | 184.8 | 83.1 |
| 96µm to < 128µm | 18.5 | 49.3 | 222.5 | 117.0 | 113.2 | 73.2 | 53.2 | 73.2 |
| 128µm to < 160µm | 24.6 | 24.6 | 117.8 | 75.4 | 92.4 | 187.8 | 24.6 | 90.1 |
| 160µm + | 24.6 | 24.6 | 24.6 | 24.6 | 24.6 | 24.6 | 24.6 | 62.4 |

| Distance to Target Position (Segment of the travel range) | VELOCITY CONTROL FACTOR (i.e., If Hybrid Velocity Control: 0 to 128 corresponds to 0% to 100% full bridge ratio. If PWM Velocity Control: 0 to 128 corresponds to 0% to 100% Duty cycle If VIN Velocity Control: 0 to 128 corresponds to VINmin to VINmax) | | | | | | | |
|---|---|---|---|---|---|---|---|---|
| | 0µ to < 8µm | | 8µ to < 16µm | | 16µ to < 32µm | | 32+ | |
| | Fwd | Rev | Fwd | Rev | Fwd | Rev | Fwd | Rev |
| < -160µm | 0 | 0 | 16 | 56 | 8 | 72 | 24 | 64 |
| -160µm to < -128µm | 0 | 0 | 8 | 8 | 0 | 56 | 24 | 96 |
| -128µm to < -96µm | 0 | 0 | 8 | 16 | 16 | 56 | 8 | 64 |
| -96µm to < -64µm | 0 | 0 | 24 | 8 | 8 | 48 | 24 | 88 |
| -64µm to < -32µm | 0 | 80 | 48 | 8 | 64 | 40 | 64 | 112 |
| -32µm to < 32µm | 0 | 0 | 16 | 16 | 56 | 64 | 56 | 104 |
| 32µm to < 64µm | 0 | 0 | 32 | 96 | 56 | 88 | 56 | 128 |
| 64µm to < 96µm | 0 | 0 | 32 | 48 | 64 | 80 | 64 | 112 |
| 96µm to < 128µm | 0 | 0 | 16 | 64 | 96 | 64 | 120 | 112 |
| 128µm to < 160µm | 0 | 40 | 88 | 8 | 64 | 48 | 64 | 40 |
| 160µm + | 64 | 64 | 64 | 64 | 64 | 64 | 64 | 0 |

FIG. 9B

METHODS FOR CONTROLLING ONE OR MORE POSITIONING ACTUATORS AND DEVICES THEREOF

FIELD

This technology generally relates to positioning actuators and, more particularly, to methods and systems for controlling one or more positioning actuators to move a moveable element to target position.

BACKGROUND

A piezoelectric material changes shape when subjected to an electric field. With the appropriate structure design, this change of shape can be translated into a displacement. In positioning actuators, such as piezoelectric motors, this displacement is harvested into linear or rotary motion. When the displacement is at ultrasonic frequencies, the piezo motors are defined as piezoelectric ultrasonic motors. Piezoelectric ultrasonic motors are frequently driven at resonance or semi resonance to take advantage of the amplification of the displacement due to the resonance itself. Piezoelectric ultrasonic resonant motors are used in a variety of motion control applications that require for example precise stepping, high acceleration, high velocity, small size, high force, zero-power hold, and no magnetic fields.

Positioning actuators, such as piezoelectric ultrasonic motors, may be driven using full bridge or half bridge drive circuitry. In the case of an ultrasonic motor, the motor vibrates mechanically at a frequency dictated by the drive circuitry and, if the amplitude of displacement is sufficient, the motor will generate external motion.

Positioning actuators have a multitude of practical applications, including for positioning a camera lens, such as the lens of a smartphone, camera phone, or other camera device. Positioning actuators used, for example in AutoFocus systems for mobile phone camera modules, require fast settling times (on the order of 20 ms or less) and low audible noise (on the order of 35 dB or less). Unfortunately, while fast settling times are dependent on how quickly the position control system can move a lens into position, the acoustic audible emissions of positioning actuators driven by the control system are increased as the positioning actuators are driven at higher velocity.

Different strategies have been developed to set the velocity of external motion for positioning actuators, such as ultrasonic motors, with the aim of reducing power and audible acoustic noise. Given these existing strategies to set the velocity, it also is desirable to adjust the output velocity of the positioning actuator. Such adjustments may be done using an open loop control system or a closed loop control system.

An open loop controller, also defined as a non feedback controller, is a controller that computes its input in the system based only on the current state of the system and the model of the system that the controller has. It is relatively cheap since it does not require feedback sensors but can be very imprecise with nonlinear systems.

With a closed loop controller, also defined as feedback controller, the controller determines the input in the system based on a difference between feedback from a sensory system and a target set point. Closed loop control systems are more expensive due to the need for a sensory system, but they are more precise and can be adaptive.

In the context of a positioning actuator that is used, for example, to drive a focusing element, such as a lens into a target position in less then twenty milliseconds, a very efficient closed loop control system is required. Unfortunately, positioning actuators may have high variability in terms of their control factors. For example, the distance a moveable object can be moved as the result of a certain number of input driver pulses (pulses per unit distance) can vary one order of magnitude or more from one positioning actuator to another and is dependent on many factors. These factors can include the driving voltage, the driving waveform, the location of the positioning actuator contact with the moveable element relative to the total range of travel, the surface properties of the friction parts, and tolerances of the parts and assembly. This variability makes many positioning actuators, such as friction based ultrasonic motors, unsuitable for closed loop control using a proportional-integral-derivative controller (PID controller) as is often common for other types of motors. Therefore, efficient control schemes to enable fast operation with suitable noise reduction remain elusive for positioning actuator systems, such as ultrasonic motors.

SUMMARY

A method for controlling a moveable element includes generating and providing with a control device one or more driving signals to one or more positioning actuators to move the moveable element towards a target position based on a target travel distance and a calibration value. The control device determines when a post-movement position of the moveable element is outside of a tolerance range of the target position. The control device recalibrates the calibration value when the post-movement position is determined to be outside of the tolerance range. The control device repeats the generating, the determining, and the recalibrating as open loop steps until the post-movement position is within the tolerance range.

A computer readable medium having stored thereon instructions for controlling a moveable element comprising machine executable code which when executed by at least one processor, causes the processor to perform steps including generating and providing one or more driving signals to one or more positioning actuators to move the moveable element towards a target position based on a target travel distance and a calibration value. A determination is made when a post-movement position of the moveable element is outside of a tolerance range of the target position. The calibration value is recalibrated when the post-movement position is determined to be outside of the tolerance range. The generating, determining, and recalibrating are repeated as open loop steps until the post-movement position is within the tolerance range.

A positioning system for a moveable element includes at least one position sensor for monitoring a position of the moveable element, a drive signal generation device, one or more positioning actuators coupled to the drive signal generation device and operatively coupled to the moveable element, and a control device coupled to the position sensor and the drive signal generation device. The control device comprising one or more processors and a memory coupled to the one or more processors, the one or more processors configured to execute programmed instructions stored in the memory. The programmed instruction include generating and providing one or more driving signals to one or more positioning actuators to move the moveable element towards a target position based on a target travel distance and a calibration value. A determination is made when a post-movement position of the moveable element is outside of a tolerance range of the target position. The calibration value is recalibrated when the post-movement position is determined to be outside of the tolerance range. The generating, determining, and recalibrating are repeated as open loop steps until the post-movement position is within the tolerance range.

This technology provides a number of advantages including providing a method and apparatus that controls a positioning actuator with more precise steps in less total time and with less acoustic noise generation. More specifically, examples of this technology effectively implement a series of open-loop steps where a pulse coefficient for the positioning actuator and a velocity control factor are adjusted using a calibration look-up table. The values in the calibration table may be continuously updated using the actual movement in each open loop step measured by a position sensor. Input values for pulse coefficient and velocity control factor may be mapped over a range of travel, a size of a movement step (distance to target for the step), and the direction of movement.

BRIEF DESCRIPTION OF THE DRAWINGS

FIGS. 9A and 9B are exemplary calibration tables used with a method for controlling a positioning actuator configured to move a moveable element.

DETAILED DESCRIPTION

Figure 1:
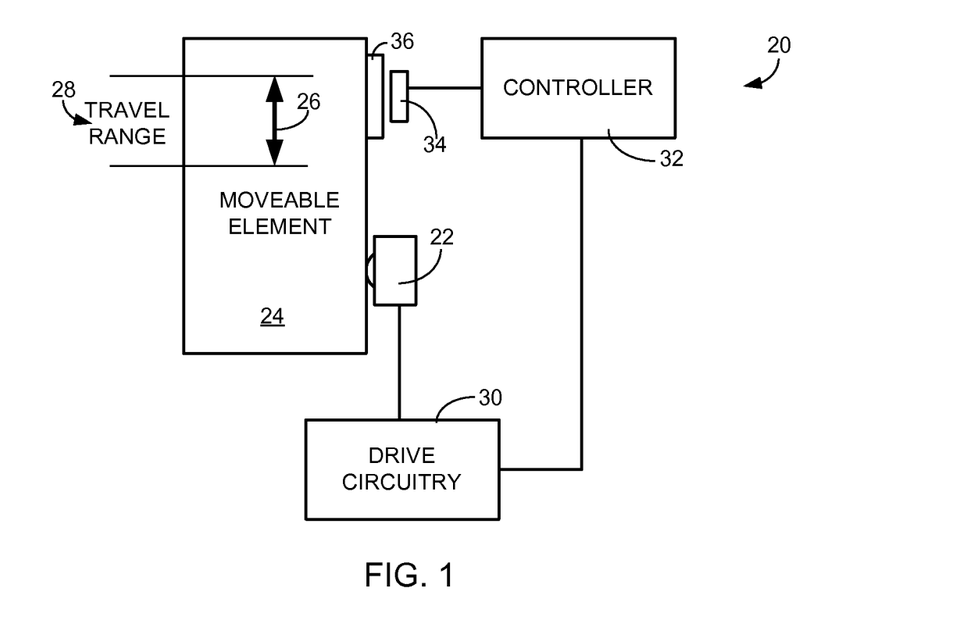
FIG. 1 is a block diagram of one example of a system for controlling one or more positioning actuators.

An exemplary system 20 for controlling a positioning actuator 22 is illustrated in FIG. 1. The system 10 includes the positioning actuator 22, a moveable element 24, drive circuitry 30, a controller 32, a position sensor 34, and encodings 36, although the system can include other types and numbers of systems, devices, components, and other elements in other configurations. This technology provides a number of advantages including providing a method and apparatus that controls a positioning actuator with more precise steps in less total time and with less acoustic noise generation.

Referring more specifically to FIG. 1, the positioning actuator 22 is a piezoelectric ultrasonic motor, although the system 20 can use other types and numbers of positioning actuators, such as a magneto-strictive actuator, a one phase motor, or a two phase motor by way of example only. The positioning actuator 22 produces linear motion, although the positioning actuator could be configured to provide motion in other directions and manners, such as non-linear motion or rotary motion. The positioning actuator 22 is operatively coupled to the moveable element 24 and in this example when properly driven moves the moveable element 24 forwards or backwards along a path 26 over a given travel range 28.

The moveable element 24 is positioned for interaction with the positioning actuator 22 and with the position sensor 34, although the moveable element could be positioned or otherwise coupled to other types and numbers of systems, devices, components, and other elements in other configurations. In this example, the moveable element 24 is a camera lens, although other types of moveable objects could be used.

The drive circuitry 30 is coupled for communication with the controller 32 and the positioning actuator 22, although the drive circuitry 30 can be coupled to other numbers and types of systems, devices, components, and other elements in other configurations. The drive circuitry 30 provides one or more drive signals to the positioning actuator 22 based on one or more control signals received from a controller 32, although the drive circuitry could be controlled in other manners. Examples of driver circuitry 30 which can be utilized with this technology are illustrated and described with reference to FIGS. 2, 4, and 6, although other types and numbers of driving systems in other configurations could be used.

The controller 32 is coupled for communication with the drive circuitry 30 and the position sensor 34, although the controller 32 can be coupled to other numbers and types of systems, devices, components, and other elements in other configurations. In this example, the controller 32 is a computing device with at least one central processing unit (CPU) or processor, at least one memory, and an interface unit which are coupled together by a bus or other numbers and types of links, although the controller could comprise other numbers and types of systems, devices, components and other elements in other configurations.

The central processing unit (CPU) or processor of the controller 32 executes a program of stored instructions for one or more aspects of the technology as described herein. The memory of the controller 32 stores these programmed instructions for one or more aspects of the technology as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor of the controller 32, can be used for the memory of the controller 32. The interface unit of the controller 32 is used to operatively couple communications between the controller 32 and the drive circuitry 30 and the position sensor 34, although other types and numbers of systems, devices, components, and other elements could be coupled together for communications.

Although an exemplary controller 32 is described and illustrated herein, other types and numbers of systems, devices, components, and other elements in other configurations could be used. It is to be understood that the controller 32 described herein is for exemplary purposes, as many variations of the specific hardware and software used to implement the examples are possible, as will be appreciated by those skilled in the relevant art(s).

Furthermore, the controller 32 may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for the controller 32 in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples of the operation of the controller 32 may also be embodied as a computer readable medium having instructions stored thereon for one or more aspects of the technology as described and illustrated by way of the examples herein, which when executed by a processor, cause the processor to carry out the steps necessary to implement the methods of the examples, as described and illustrated herein.

The position sensor 34 is coupled to the controller 32 and is placed so that the controller 32 can determine a position of the moveable element 24, although the position sensor 34 can be coupled and otherwise placed adjacent to other numbers and types of systems, devices, components, and other elements in other configurations. In this example, the position sensor 34 is a displacement sensor that monitors linear motion of moveable element 24, although other types and numbers of position sensors which monitor other types of motions could be used.

Encodings 36 are located on the movable element 24, although the encodings are optional and other types and combinations of elements with a property that changes over the travel range 28 could be used, such as a permanent magnet or surface with variable reflectance. The encodings 36 can be read by the position sensor 34 for more accurate position determination, although the encodings could be processed in other manners. For example a Hall-effect sensor can measure the change in magnetic field as the permanent magnet moves or a photo emitter/detector pair can measure the changing intensity of light reflected from a moving surface with changing reflectivity. The encodings 36 also can include one or more reference encodings to indicate a home position and an end of travel range position to the position sensor 34, although the reference codings are optional and other types and number of encodings could be used.

Figure 2:
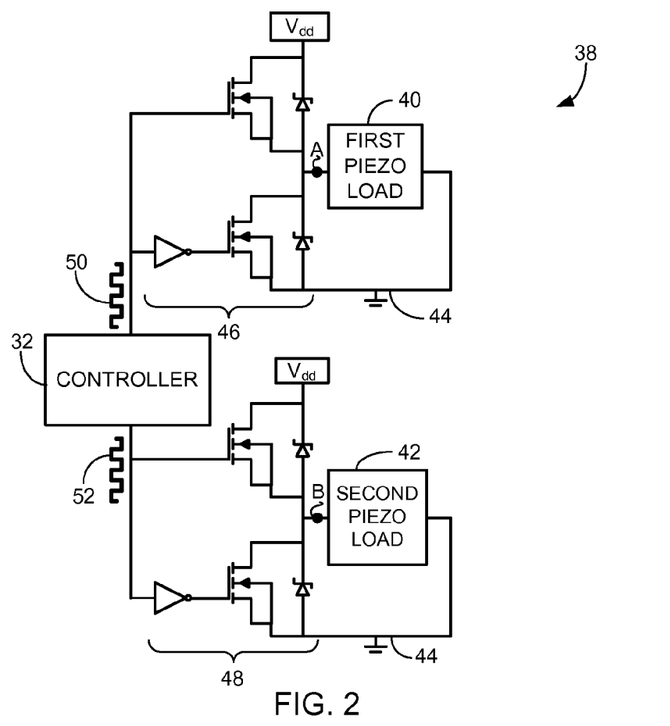
FIG. 2 is a partial block diagram and partial schematic diagram of another exemplary system for controlling a positioning actuator with a half bridge drive circuitry.

Referring to FIG. 2, another exemplary system 38 for controlling a positioning actuator is illustrated. Exemplary system 38 is the same as exemplary system 20 except as illustrated and described herein. Elements in exemplary system 38 which are like those in exemplary system 20 will have like reference numerals and also may not be described again.

In exemplary system 38, the drive circuitry 30 comprises first and second half bridge drive circuits 46, 48 and the positioning actuator 22 comprises first and second piezoelectric loads 40, 42, although other types and numbers of driving systems and positioning actuators could be used. The controller 32 is coupled to each of the first and second half bridge drive circuits 46, 48. The half bridge drive circuit 46 is coupled to the first piezoelectric load 40 and the half bridge circuit 48 is coupled to the second piezoelectric load 42. One side of each of the first and second piezoelectric loads 40, 42 is coupled to ground 44. The other side of the first piezoelectric load 40 is coupled at point A to the half bridge drive circuit 46. The other side of second piezoelectric load 42 is coupled at point B to the half bridge drive circuit 48. Since the particular structure and operation of the illustrated half bridge circuits 46 and 48, as well as other types and configurations of half bridge drive circuits, is well known to those of ordinary skill in the art and they will not be described here. Although one configuration of system 38 is shown other configurations with other types and numbers of systems, device and element could be used.

The operation of the exemplary system 38 will now be described with reference to FIGS. 2 and 3A-3C. The controller 32 is configured to provide low voltage drive pulses 50, 52 to the first and second half bridge drive circuits 46 and 48, respectively. Each half bridge drive circuit 46, 48 is configured to apply a drive voltage Vdd to its respective piezoelectric load 40, 42 in accordance with the timing of the drive pulses 50, 52. The first and second piezoelectric loads 40, 42 repeatedly change shape in accordance with the magnitude and timing of the applied low voltage drive pulses 50, 52 and are configured to impart movement to the moveable element 24 (shown in FIG. 1) in a forward or reverse direction and at a particular velocity.

In this example, the first and second piezoelectric loads 40, 42 need to be driven by the first and second half bridge drive circuits 46, 48, respectively, to impart movement to the moveable element 24. The manner in which a piezoelectric load may impart movement to a moveable element is well known to those of ordinary skill in the art and thus will not be described here. By way of example only, exemplary manners in which one or more piezoelectric loads may impart movement to a moveable element are illustrated and described in: U.S. Pat. No. 6,940,209: U.S. Patent Application Publication No. 2008/0297923: and U.S. patent application Ser. Nos. 12/228,942; 12/460,701; and 12/608,726, each of which is herein incorporated by reference in their entireties.

Figure 3A:
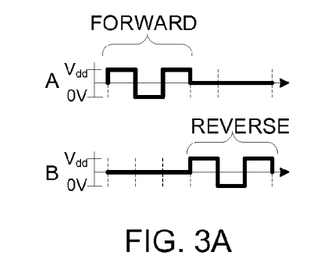
FIGS. 3A-3C are timing diagrams of exemplary drive signal schemes used to control a direction of movement and a velocity for a moveable element coupled to a positioning actuator driven by half bridge drive circuitry.

By way of example only, in system 38 the positioning actuator 22 comprising first and second piezoelectric loads 40, 42 may be configured to move the moveable element 24 in a forward direction. To move the moveable element 24 in a forward direction, the drive pulses 50 illustrated in the first half of FIG. 3A are applied only to the first half bridge drive circuit 46. This result in the drive voltage Vdd being applied only to point A while no drive voltage is applied to point B. Alternatively, to move the moveable element 24 in a reverse direction, the drive pulses 52 illustrated in the second half of FIG. 3A are applied only to the second half bridge drive circuit 48. This results in the drive voltage Vdd being applied only to point B while no drive voltage is applied to point A.

Figure 3B:
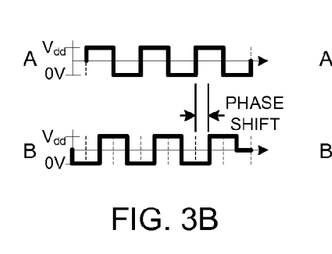
Figure 3C:
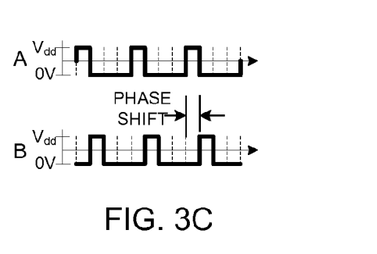

In another example, drive pulses 50 and 52 as illustrated in FIG. 3B may be applied simultaneously to the first and second half bridge drive circuits 46, 48. In this example, positioning actuator 22 comprising first and second piezoelectric loads 40, 42 may be configured to determine a movement direction for the moveable element 24 based on a phase shift between the drive pulses 50 and 52 which results in a phase shift of the driver voltage applied to points A and B of the first and second piezoelectric loads 40, 42. For example, a +90 degree phase shift could cause movement of the moveable element 24 in a forward direction, and a −90 degree phase shift could cause movement of the moveable element in a reverse direction.

In addition to being able to control a direction of movement of moveable element 24, the exemplary system 38 may also be used to control a velocity of the positioning actuator 22 comprising first and second piezoelectric loads 40, 42. For example, the velocity of this positioning actuator 22 may be adjusted if the controller 32 is configured to adjust the voltage level for supply voltage Vdd between a minimum voltage VINmin and a maximum voltage VINmax. The velocity of this positioning actuator 22 may be increased as the supply voltage Vdd is increased. An alternate way to control velocity of the positioning actuator 22 is through pulse width modulation (PWM) control of the drive pulses. As the duty cycle percentage of the drive pulses increases, the velocity of this positioning actuator 22 will increase and visa versa. For example, the same positioning actuator 22 being driven by the 50% duty cycle illustrated in FIG. 3B will have a higher velocity than when being driven by the 25% duty cycle illustrated in FIG. 3C. Therefore, VIN (driver supply voltage) and PWM are two non-limiting examples of velocity control factors for this positioning actuator 22.

Figure 4:
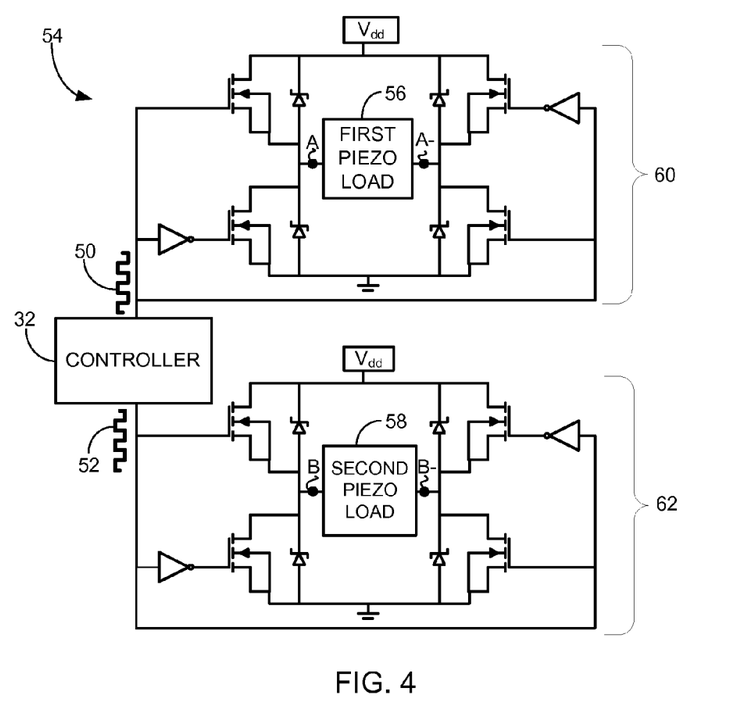
FIG. 4 is a partial block diagram and partial schematic diagram of another exemplary system for controlling a positioning actuator with a full bridge drive circuitry.

Referring to FIG. 4, another exemplary system 54 for controlling a positioning actuator 22 is illustrated. Exemplary system 54 is the same as exemplary system 20 except as illustrated and described herein. Elements in exemplary system 54 which are like those in exemplary system 20 will have like reference numerals and also may not be described again.

In exemplary system 54, the drive circuitry 30 comprises first and second full bridge drive circuits 60, 62 and the positioning actuator 22 comprises first and second piezoelectric loads 56, 58, although other types and numbers of driving systems and positioning actuators could be used. The controller 32 is coupled to each of the first and second full bridge drive circuits 60, 62. The full bridge drive circuit 60 is coupled to the first piezoelectric load 56 and the full bridge circuit 62 is coupled to the second piezoelectric load 58. One side of first piezoelectric load 56 is coupled at point A to the full bridge drive circuit 60. The other side of first piezoelectric load 56 is coupled at point A− to the first full bridge drive circuit 60. Similarly, one side of second piezoelectric load 58 is coupled at point B to the full bridge drive circuit 62. The other side of second piezoelectric load 58 is coupled at point B− to the second full bridge drive circuit 62. Since the particular structure and operation of the illustrated first and second full bridge drive circuits 60, 62, as well as other types and configurations of full bridge drive circuits, is well known to those of ordinary skill in the art and they will not be described here. Although one configuration of system 54 is shown other configurations with other types and numbers of systems, device and element could be used.

The operation of the exemplary system 54 will now be described with reference to FIGS. 4 and 5A-5C. The controller 32 is configured to provide low voltage drive pulses 50, 52 to the first and second full bridge drive circuits 60 and 62, respectively. The first full bridge drive circuit 60 is configured to apply a drive voltage Vdd in a first polarity configuration to one side of the first piezoelectric load 56 and apply the drive voltage Vdd in a second polarity configuration to the other side of the first piezoelectric load 56 in accordance with the timing of the drive pulses 50. The full bridge drive circuit can therefore effectively apply a driving voltage signal that runs from +Vdd to −Vdd across the piezoelectric load 56, thereby creating a stronger electric field across the piezoelectric loads when compared to the half bridge drive circuit described with reference to FIGS. 2 and 3A-3C. The stronger electric field made possible in this example can be used to drive the piezoelectric load 56 with more power resulting in higher velocities for this positioning actuator 22. The second full bridge drive circuit 62 operates on the second piezoelectric load 58 in response to the drive pulses 52 in the same manner to the first full bridge drive circuit 60 illustrated and described above. As in the examples described with reference to FIGS. 2 and 3A-3C, the first and second piezoelectric loads 56, 58 also repeatedly change shape in accordance with the magnitude and timing of the applied drive voltage and can be configured to impart movement to the moveable element 24 operatively coupled to this positioning actuator 22 comprising piezoelectric loads 56, 58 in a forward or reverse direction and at a particular velocity.

Figure 5A:
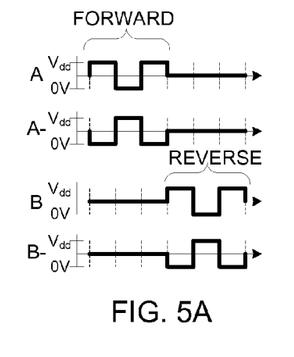
FIGS. 5A-5C are timing diagrams of exemplary drive signal schemes used to control a direction of movement and a velocity for a moveable element coupled to one or more positioning actuators driven by full bridge drive circuitry.

By way of example only, in system 54 the positioning actuator 22 comprising first and second piezoelectric loads 56, 58 may be configured to move the moveable element 24 in a forward direction. To move the moveable element 24 in a forward direction, the drive pulses 50 illustrated in the first half of FIG. 5A are applied only to the first full bridge drive circuit 60, resulting in a voltage drive signal being applied across points A, A− while no voltage drive signal is applied across points B, B−. Alternatively, to move the moveable element 24 in a reverse direction, the drive pulses 52 illustrated in the second half of FIG. 5A are applied only to the second full bridge drive circuit 62, resulting in a voltage drive signal being applied across point B, B−while no voltage drive signal is applied across points A, A−.

Figure 5B:
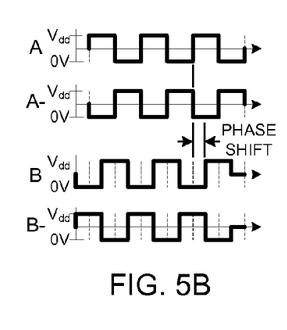
Figure 5C:
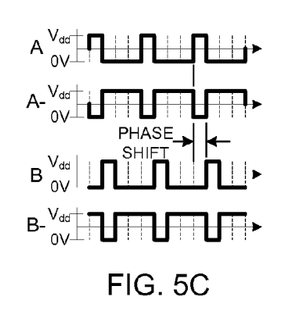

In another example, drive pulses 50 and 52 as illustrated in FIG. 5B may be applied simultaneously to the first and second full bridge drive circuits 46, 48. In this example, positioning actuator 22 comprising first and second piezoelectric loads 56, 58 may be configured to determine a movement direction for the moveable element 24 based on a phase shift between the drive pulses 50 and 52 which results in a phase shift of the driver voltage applied across points A, A− and across points B, B− of the first and second piezoelectric loads 56, 58. For example, a +90 degree phase shift could cause movement of the moveable element 24 in a forward direction, and a −90 degree phase shift could cause movement of the moveable element in a reverse direction.

In addition to being able to control a direction of movement of moveable element 24, the exemplary system 54 may also be used to control a velocity of the positioning actuator 22 comprising first and second piezoelectric loads 56, 58. For example, the velocity of this positioning actuator 22 may be adjusted if the controller 32 is configured to adjust the voltage level for supply voltage Vdd between a minimum voltage VINmin and a maximum voltage VINmax. The velocity of this positioning actuator 22 may be increased as the supply voltage Vdd is increased. An alternate way to control velocity of the positioning actuator 22 is through pulse width modulation (PWM) control of the drive pulses. As the duty cycle percentage of the drive pulses increases, the velocity of this positioning actuator 22 will increase and visa versa. For example, the same positioning actuator 22 being driven by the 50% duty cycle illustrated in FIG. 5B will have a higher velocity than when being driven by the 25% duty cycle illustrated in FIG. 5C. Therefore, VIN (driver supply voltage) and PWM are two non-limiting examples of velocity control factors for this positioning actuator 22.

Figure 6:
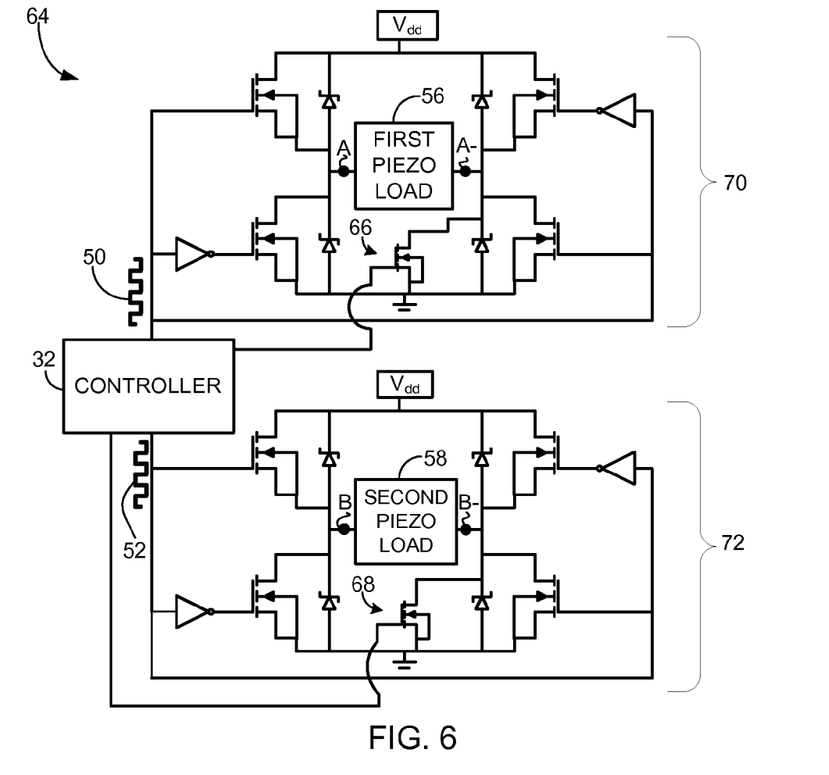
FIG. 6 is a partial block diagram and partial schematic diagram of another exemplary system for controlling a positioning actuator with a hybrid (selectable half or full) bridge drive circuitry.

Referring to FIG. 6, another exemplary system 64 for controlling a positioning actuator is illustrated. Exemplary system 64 is the same as exemplary system 20 except as illustrated and described herein. Elements in exemplary system 64 which are like those in exemplary system 20 will have like reference numerals and also may not be described again.

In exemplary system 64, the drive circuitry 30 comprises first and hybrid drive circuits 70, 72 and the positioning actuator 22 comprises first and second piezoelectric loads 56, 58, although other types and numbers of driving systems and positioning actuators could be used. The controller 32 is coupled to each of the first and hybrid drive circuits 70, 72.

The hybrid drive circuit 70 is coupled to the first piezoelectric load 56 and the hybrid bridge circuit 72 is coupled to the second piezoelectric load 58. One side of first piezoelectric load 56 is coupled at point A to the hybrid drive circuit 70. The other side of first piezoelectric load 56 is coupled at point A− to the hybrid drive circuit 70. Similarly, one side of second piezoelectric load 58 is coupled at point B to the hybrid drive circuit 72. The other side of second piezoelectric load 58 is coupled at point B− to the hybrid drive circuit 72. Selection switching circuitry 66 is coupled to and can be used by the controller 32 to disable half of the first hybrid drive circuit 70 so that the hybrid drive circuit 70 acts as a half bridge circuit. Conversely, the selection switching circuitry 66 may be set to enable full bridge circuit functionality for the first hybrid drive circuit 70. Additionally, selection switching circuitry 68 is coupled to and can be used by the controller 32 to disable half of the second hybrid drive circuit 72 so that the hybrid drive circuit 72 acts as a half bridge circuit. Conversely, the selection switching circuitry 68 may be set to enable full bridge circuit functionality for the second hybrid drive circuit 72. Since the particular structure and operation of the illustrated first and second hybrid bridge drive circuits 70, 72, as well as other types and configurations of full bridge drive circuits, is well known to those of ordinary skill in the art and they will not be described here. Although one configuration of system 64 is shown other configurations with other types and numbers of systems, device and element could be used.

Figure 7:
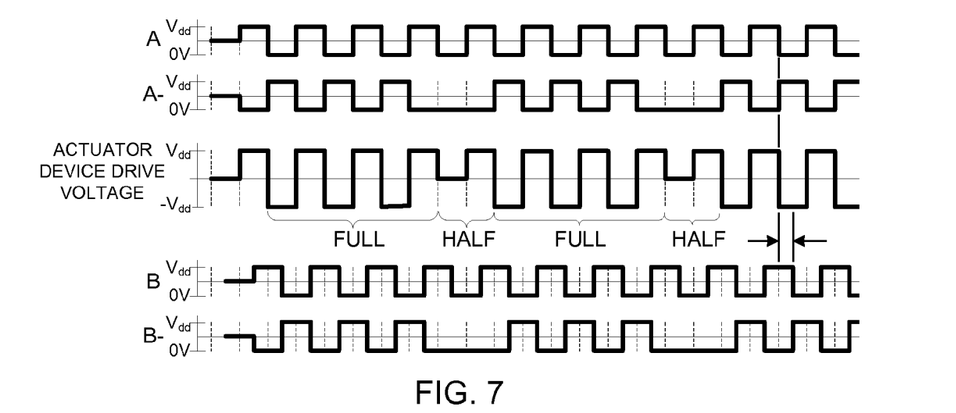
FIG. 7 are timing diagrams of exemplary drive signal schemes used to control a direction of movement and a velocity for a moveable element coupled to one or more positioning actuators driven by hybrid bridge drive circuitry.

The operation of the exemplary system 64 will now be described with reference to FIGS. 6 and 7. The controller 32 is configured to either disable half of the first hybrid drive circuit 70 so that the hybrid drive circuit 70 acts as a half bridge circuit or enable the first hybrid drive circuit 70 so that the hybrid drive circuit 70 acts as a full bridge circuit. Additionally, the controller 32 is configured to either disable half of the second hybrid drive circuit 72 so that the hybrid drive circuit 72 acts as a half bridge circuit or enable the second hybrid drive circuit 72 so that the hybrid drive circuit 72 acts as a full bridge circuit. The operation of the first and second hybrid drive circuits 70, 72 when disabled to act as half bridge circuits are the same as illustrated and described earlier with the system 38 shown in FIG. 2. Additionally, the operation of the first and second hybrid drive circuits 70, 72 when enabled to act as a full bridge circuit is the same as illustrated and described earlier with the system 54 shown in FIG. 4.

As illustrated and described with respect to the system 38 shown in FIG. 2 and the system 54 shown in FIG. 4, the direction of movement with the system 64 shown in FIG. 6 can also be manipulated by adjusting the phase shift between the signals applied to the different piezoelectric loads 56, 58. In addition to the VIN and PWM velocity control methods of the previously described examples with systems 38 and 54, the hybrid bridge drive circuitry enables a further method of controlling the velocity of the positioning actuator. The hybrid drive circuits 70, 72 may be operated based on a "full bridge ratio" where the ratio of drive pulses under full bridge conditions to half bridge conditions is adjusted. FIG. 7 illustrates an example of the driving signal differences when switching between full bridge mode and half bridge mode. Time spent in half bridge drive mode tends to reduce the actuator device drive voltage, contributing to a lower positioning actuator velocity. Therefore, when the full bridge ratio is higher, the velocity of the positioning actuator 22 will be higher and visa versa.

For positioning actuators, such as piezoelectric ultrasonic actuators, the distance moved by the moveable element 24 against the positioning actuator 22 is a function of the number of pulses generated by the drive circuitry 30 as well as the velocity of the positioning actuator 22. The distance moved by the moveable element 24 increases with increasing pulse count and/or increasing velocity. The distance moved may also depend on the mass of the moveable element 24 and any load coupled to it. Therefore, in order to command moves of a specific distance, there does need to be a position sensor 34 so that the controller 32 is able to know if the moveable element 24 has reached a desired target position.

Figure 8A:
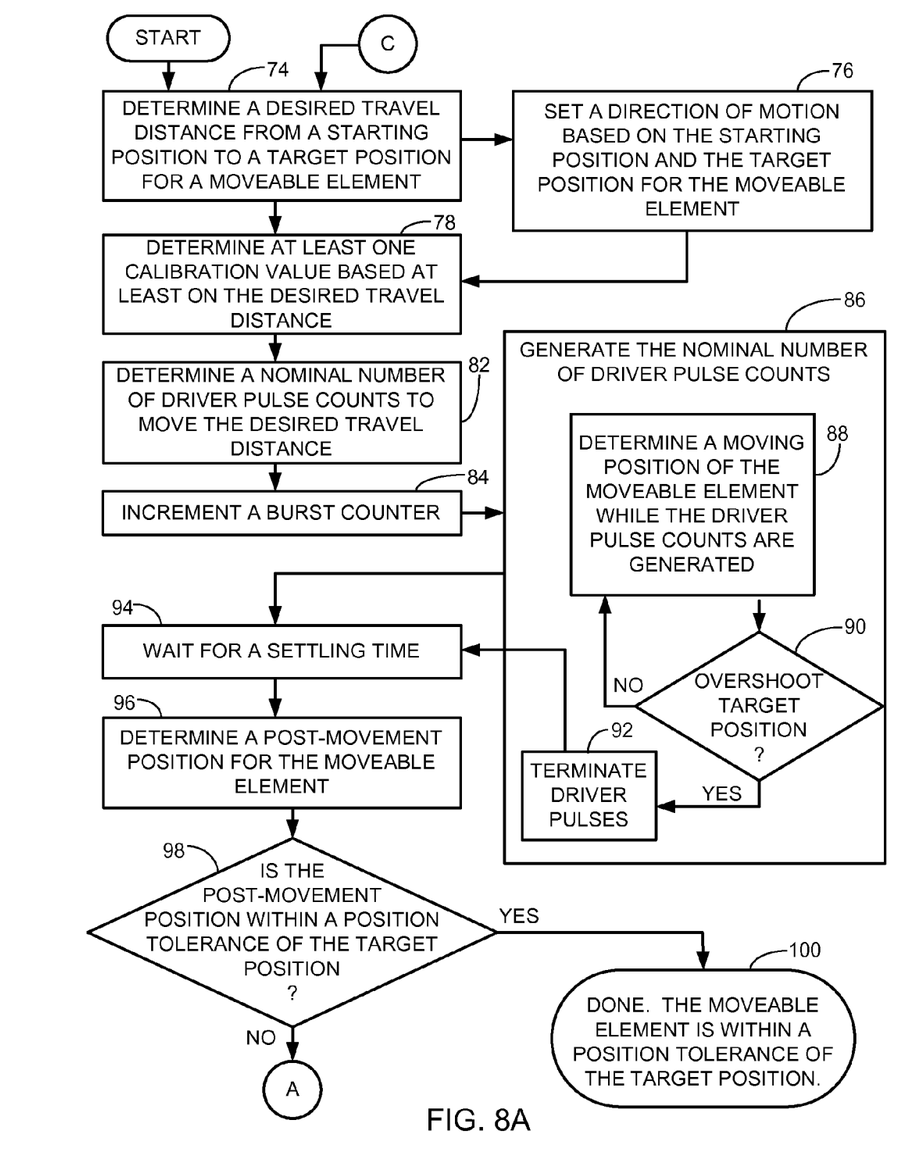
FIGS. 8A-8C are flow charts of an exemplary method for controlling a positioning actuator configured to move a moveable element.
Figure 8B:
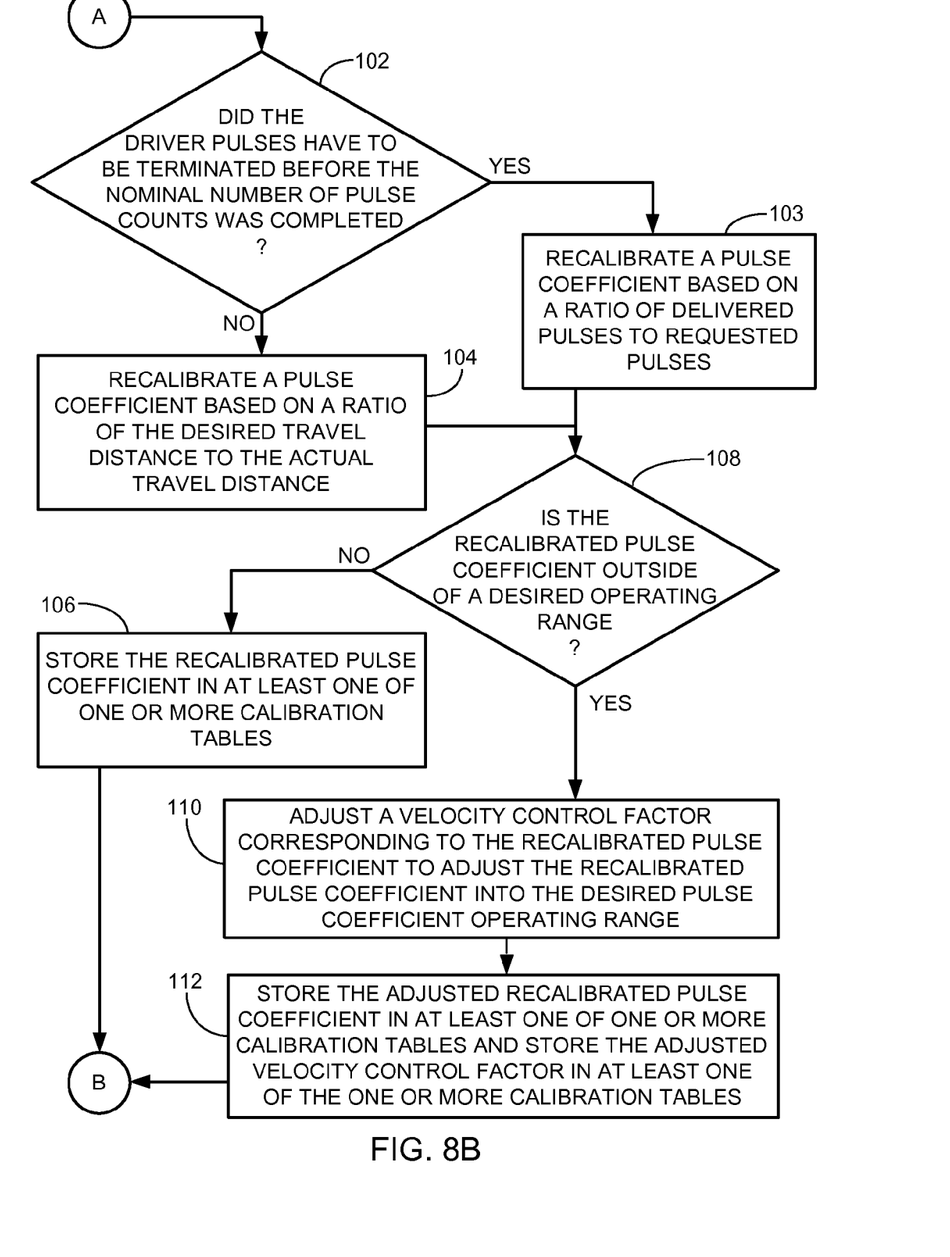
Figure 8C:
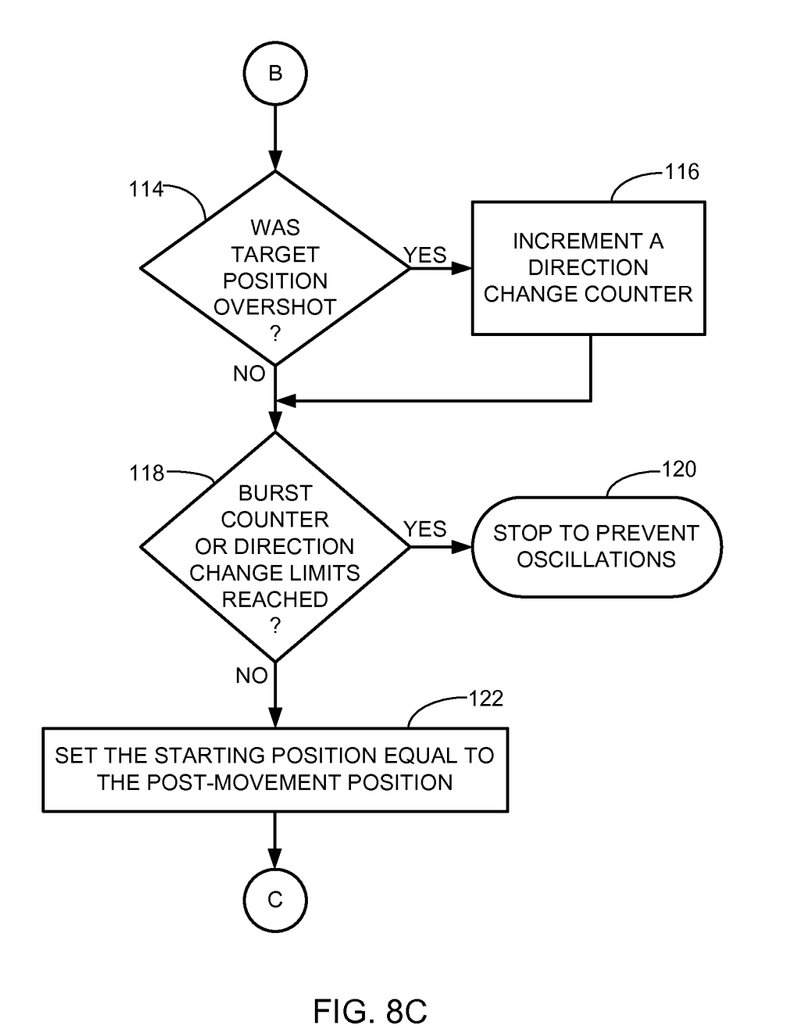

Referring to FIGS. 8A-8C, an exemplary method for controlling the positioning actuator 22 to move the moveable element 24 with one of the exemplary system 38 is illustrated. This method is the same for exemplary systems 54 and 64, except as otherwise illustrated and described herein.

In step 74, a desired travel distance is determined from a starting position to a target position for the moveable element 24 by the controller 32, although other manners for obtaining the desired travel distance could be used. Next in step 76, the controller 32 determines and sets a direction of motion based on knowledge of the starting position and the target position, although other manners for obtaining the direction of motion could be used and this step is optional.

In step 78, at least one calibration value is determined by the controller 32 based on the desired travel distance from exemplary calibration tables illustrated in FIGS. 9A and 9B, although the calibration values can be obtained in other manners, from other sources, and based on other types and numbers of factors. By way of example only, the at least one calibration value could be obtained by the controller 32 based on the desired travel distance (distance to target), the direction of movement (forward or reverse), and the segment of the travel range for the starting position.

Referring to FIG. 9A, the calibration values in this table are pulse coefficients stored in the controller 32 that the controller 32 can use to set the number of pulses, although the calibration values could be stored in other locations. For example, the pulse coefficients could represent a number of expected drive pulses per unit distance moved by the moveable element 24. This pulse coefficient could be expressed, for example, as pulses per micron (PPMU). The pulse coefficients alternatively could be expressed as pulses per encoder count (the number of drive pulses per encoder pulse as measured with the position sensor). The columns of the calibration table of FIG. 9A are sorted at the highest level by a distance to a target position. The FIG. 9A calibration table columns are further sorted in this example by a direction of movement. Each row of the calibration table represents a segment of the travel range for the moveable element 24. An appropriate row may be selected based on the starting position sensed by the position sensor 34 (in other words, based on which segment of the travel range the starting position falls into).

By way of example only and using the calibration table of FIG. 9A, if the desired travel distance is 6 μm in a reverse direction, and the segment of the travel range for the starting position is −96 μm to <−64 μm, then the pulse coefficient of 49.3 (could be PPMU or pulses per encoder count, depending on the example) could be selected from pulse coefficient cell 80 of the calibration table of FIG. 9A. Although one example of a calibration table has been shown and described with reference to FIG. 9A, other types and numbers of calibration tables could be used.

For example, another exemplary calibration table which could be stored and used by controller 32 is illustrated in FIG. 9B. This calibration table is organized in the same manners as the calibration table shown in FIG. 9A, except velocity control factors values are used instead of pulse coefficients. Depending on the example, the velocity control factor also may be: a value representative of a full bridge ratio for a hybrid velocity control scheme; a duty cycle for a PWM velocity control scheme; or a supply voltage level for a voltage-based velocity control scheme, although other types and numbers of values could be represented. Additionally, other calibration tables stored and used by the controller 32 could have more or fewer dimensions than the exemplary dimensions illustrated and described herein.

Referring back to FIG. 8A, a nominal number of driver pulse counts to move the desired travel distance is determined by the controller 32 based on the obtained calibration value and the desired travel distance in step 82, although other manners for determining the driving signal could be used. In this example, assuming the system 38 is measuring the distance in microns, and the calibration value is a pulse coefficient representing a number of pulses per micron (PPMU) obtained from the table shown in FIG. 9A, then the nominal driver pulse count could be determined by controller 32 as follows:

$$Nominal\_Driver\_Pulse\_Count = (Desired\_Travel\_Distance) \times (PPMU)$$

In step 84, a burst counter may be incremented by the controller 32 with the determined nominal number of driver pulse counts so a cumulative number of driver pulse counts can be tracked, although this step is optional.

In step 86, the nominal number of driver pulse counts is generated by the controller 32 coupled to drive circuitry 30 in system 38. As discussed above, generation of driver pulses will cause the positioning actuator 22 to move the moveable element 24.

In step 88, while the driver pulses are being generated in step 86, a moving position of the moveable element 24 is determined, although steps 88-92 are optional. Next in step 90, the controller 32 determines with data from the position sensor 34 if the moving position of the moveable element 24 has overshot the target position. If in step 90, the controller 32 determines the moving position of the moveable element 24 has not overshot the target position, then the No branch is taken back to step 88. If in step 90, the controller 32 determines the moving position of the moveable element 24 has overshot the target position, then the yes branch is taken back to step 92 where the driver pulse generation is terminated.

Once the driver pulse generation has been ended, in step 94 the controller 32 waits for a stored settling time to expire before proceeding, although this step is optional. The settling time may be a predefined and/or user definable parameter obtained and stored by the controller 32, although the settling time can be obtained in other manners and stored in other locations.

In step 96, after the driver pulse generation has ended, the controller 32 with position sensor 34 determines a current or post-movement position for the moveable element 24, although other manners for determining the post movement position of the moveable element 24 could be used. In step 98, the controller 32 determines if the post-movement position is within a position tolerance of the target position. The position tolerance may be a predefined and/or user definable parameter obtained and stored by the controller 32, although the position tolerance can be obtained in other manners and stored in other locations. If in step 98 the controller determines the post-movement position is within a position tolerance of the target position, then the Yes branch is taken to step 100 where this method ends. If in step 98 the controller determines the post-movement position is not within a position tolerance of the target position, then the No branch is taken to step 102.

In step 102, the controller 32 determines if the driver pulses had to be terminated before the nominal number of pulse counts was completed. (For example, if step 92 was taken to terminate the driver pulses because the target position had been overshot). If in step 102, the controller determines the driver pulses did have to be terminated before the nominal number of pulse counts was completed, then the Yes branch is taken to step 103. In step 103, the controller 32 recalibrates the pulse coefficient based on a ratio of delivered pulses to requested pulses as follows:

$$New\_PPMU = (PPMU \times Actual\_Pulses\_Delivered) / Number\_of\_Pulses\_Requested$$

If in step 102, the controller determines the driver pulses did not have to be terminated before the nominal number of pulse counts was completed, then the No branch is taken to step 104. In step 104, the controller 32 recalibrates the pulse coefficient (PPMU in this example) based on a ratio of the desired travel distance to the actual travel distance as follows:

$$New\_PPMU = (PPMU \times Desired\_Travel\_Distance) / Actual\_Travel\_Distance$$

If the actual travel distance was determined by the controller 32 to be shorter than the desired travel distance, then the recalibrated pulse coefficient (New_PPMU) will be larger than the existing PPMU, and visa versa. In step 106, the recalibrated pulse coefficient is stored by the controller 32 in the calibration table as a replacement for the previous PPMU.

In step 108, the controller 32 determine if the recalibrated pulse coefficient (in this example, the New_PPMU) is outside of a desired operating range stored in the controller 32, although steps 108-112 are optional. If optional steps 108-112 are not implemented, then the method proceeds from step 104 to 106. This optional step is desirable in some examples so the velocity of the positioning actuator 22 can be adjusted so the required pulses to move a given distance are not too few (acting like a sharp blow to the moveable element causing overshoot and possibly oscillations) or too many (prolonging the time for the moveable element to reach the required target). The desired operating range stored by the controller 32 may be single ended or double ended. For example, the desired operating range for the pulse coefficient may run from a minimum PPMU value to a maximum PPMU value. (PPMUmin to PPMUmax). If in step 108 the controller 32 determines the recalibrated pulse coefficient is not outside of a desired operating range, then the No branch is taken to step 106 where the new recalibrated pulse coefficient is stored in the table by the controller 32. If in step 108 the controller 32 determines the recalibrated pulse coefficient is outside of a desired operating range, then the Yes branch is taken to step 110.

In step 110, the controller 32 adjusts a velocity control factor corresponding to the recalibrated pulse coefficient. PPMU is highly dependent on the velocity of the positioning actuator, and they vary inversely. If the recalibrated pulse coefficient (in this case, New_PPMU) reaches and/or exceeds the upper limit of the desired operating range, a velocity control factor is increased by the controller 32 (in order to further adjust the New_PPMU by bringing the New_PPMU down). Alternatively if the recalibrated pulse coefficient (in this case, New_PPMU) reaches and/or drops below the lower limit of the desired operating range, the velocity control factor is reduced by the controller 32 (in order to further adjust the New_PPMU by bringing the New_PPMU up).

In step 112, the controller 32 stores the further adjusted recalibrated pulse coefficient may be stored in the exemplary calibration table shown in FIG. 9A (for example replacing the previous PPMU) in memory, although the pulse coefficients could be stored in other locations. Furthermore, the adjusted velocity control factor may also be stored by the controller in the exemplary calibration table shown in FIG. 9B so that it corresponds to the pulse coefficient in the exemplary calibration table shown in FIG. 9A.

Regarding determination by the controller 32 of a desired operating range for the pulse coefficient (in this example, the desired PPMU operating range): Since the encoder resolution of the position sensor 34 and the nominal pulse period of the driver pulse would be known, desired maximum and minimum speed values may be used to calculate the upper and lower PPMU limits as follows:

$$\text{Upper\_PPMU\_Limit} = \frac{1000 \times (\text{Encoder\_resolution})}{(\text{Lower\_Limit\_Velocity})(\text{Driver\_Pulse\_Period})}$$

$$\text{Lower\_PPMU\_Limit} = \frac{1000 \times (\text{Encoder\_resolution})}{(\text{Upper\_Limit\_Velocity})(\text{Driver\_Pulse\_Period})}$$

where the Encoder resolution is in μm; the Lower Limit Velocity is in mm/second; the Upper_Limit_Velocity is in mm/sec; and the Driver_Pulse_Period is in μseconds.

Once at least one calibration value has been recalibrated, the process may continue in FIG. 8C with optional steps 114-120. In step 114, the controller 32 determines if the target position was overshot. If in step 114, the controller 32 determines the target position was overshot, then the Yes branch is taken to step 116. In step 116, the controller 32 increments the direction change counter. If in step 114, the controller 32 determines the target position was not overshot, then the No branch is taken to step 118.

In step 118, the controller 32 checks a burst counter and/or a direction change counter to determine if a burst counter limit or a direction change limit have been reached, respectively. The burst counter limit and the direction change limit may be a predefined and/or user definable parameter obtained and stored by the controller 32, although the burst counter limit and the direction change limit can be obtained in other manners and stored in other locations. If in step 118, the controller 32 determines the burst counter limit or the direction change limit have been reached, then the Yes branch is taken to step 120 where this process ends. If in step 118, the controller 32 determines the burst counter limit or the direction change limit has not been reached, then the No branch is taken to step 122.

If neither of the burst counter or direction change limits have been reached, the system 38 is in a state where the moveable element 24 has not travelled to within a position tolerance of the target position. In step 122, the controller 32 sets the starting position to be equal to the post-movement position, and the process returns to the beginning at step 74 on FIG. 8A, where at least the open loops steps 74, 78, 82, 86, and 96 may be repeated to move the moveable element 24 towards the target position. Accordingly, as illustrated and described with reference to FIGS. 1, 2 and 8A-8C herein, the exemplary method embodied in FIGS. 8A-8C enables precise movement of the moveable element with reduced total time and with less acoustic noise generation.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for controlling a moveable element, the method comprising:
    generating and providing with a control device one or more driving signals to one or more positioning actuators to move the moveable element towards a target position based on a target travel distance and a calibration value;
    determining with a position sensor and the control device when a post-movement position of the moveable element is outside of a tolerance range of the target position;
    determining with the control device when a current position of the moveable element has overshot the target position as the one or more positioning actuators move the moveable element towards the target position;
    recalibrating with the control device the calibration value when the post-movement position is determined to be outside of the tolerance range;
    resetting with the control device the target travel distance when the current position is determined to has overshot the target position, wherein the generating and providing is based on the target travel distance after the resetting and the calibration value after the recalibrating; and
    repeating with the control device the generating, the determining, the determining, the recalibrating and the resetting as open loop steps until the post-movement position is within the tolerance range.

2. The method of claim 1 further comprising:
    determining with the control device the target travel distance based on a starting position and the target position; and
    determining with the control device the calibration value initially based on the determined target travel distance before the generating and providing.

3. The method of claim 1 further comprising setting with the control device a direction of motion based on a starting position and the target position for the moveable element, wherein the generating and providing one or more driving signals is further based on the determined direction of motion.

4. The method of claim 1 further comprising:
    determining with the control device a current position of the moveable element as the one or more positioning actuators move the moveable element towards the target position based on the generated one or more driving signals;
    determining with the control device when the current position has overshot the target position as the one or more positioning actuators move the moveable element towards the target position; and
    terminating with the control device the generating and providing the one or more driving signals when the current position is determined to have overshot the target position.

5. The method of claim 1 further comprising waiting for a first settling period of time with the control device before the determining when the post-movement position of the moveable element is outside of the tolerance range of the target position.

6. The method of claim 1 wherein the recalibrating further comprises:

determining with the control device when the calibration value after the recalibrating is outside a set operating range;
adjusting with the control device a velocity control value when the calibration value after the recalibrating is determined to be outside the set operating range;
readjusting with the control device the calibration value after the recalibrating based on the adjusted velocity control value.

7. The method of claim 1 further comprising terminating with the control device the generating and providing when a change limit has been reached.

8. A computer readable medium having stored thereon instructions for controlling a moveable element comprising machine executable code which when executed by at least one processor, causes the processor to perform steps comprising:
generating and providing one or more driving signals to one or more positioning actuators to move the moveable element towards a target position based on a target travel distance and a calibration value;
determining when a post-movement position of the moveable element is outside of a tolerance range of the target position;
determining when a current position of the moveable element has overshot the target position as the one or more positioning actuators move the moveable element towards the target position;
recalibrating the calibration value when the post-movement position is determined to be outside of the tolerance range;
resetting the target travel distance when the current position is determined to has overshot the target position, wherein the generating and providing is based on the target travel distance after the resetting and the calibration value after the recalibrating; and
repeating the generating, the determining, the determining, the recalibrating and the resetting as open loop steps until the post-movement position is within the tolerance range.

9. The medium of claim 8 further comprising:
determining the target travel distance based on a starting position and the target position; and
determining the calibration value initially based on the determined target travel distance before the generating and providing.

10. The medium of claim 8 further comprising setting a direction of motion based on a starting position and the target position for the moveable element, wherein the generating and providing one or more driving signals is further based on the determined direction of motion.

11. The medium of claim 8 further comprising:
determining a current position of the moveable element as the one or more positioning actuators move the moveable element towards the target position based on the generated one or more driving signals;
determining when the current position has overshot the target position as the one or more positioning actuators move the moveable element towards the target position; and
terminating the generating and providing the one or more driving signals when the current position is determined to have overshot the target position.

12. The medium of claim 8 further comprising waiting for a first settling period of time before the determining when the post-movement position of the moveable element is outside of the tolerance range of the target position.

13. The medium of claim 8 wherein the recalibrating further comprises:
determining when the calibration value after the recalibrating is outside a set operating range;
adjusting a velocity control value when the calibration value after the recalibrating is determined to be outside the set operating range;
readjusting the calibration value after the recalibrating based on the adjusted velocity control value.

14. The medium of claim 8 further comprising terminating the generating and providing when a change limit has been reached.

15. A positioning system for a moveable element, the system comprising:
at least one position sensor for monitoring a position of the moveable element;
drive signal generation device;
one or more positioning actuators coupled to the drive signal generation device and operatively coupled to the moveable element; and
a control device coupled to the position sensor and the drive signal generation device, the control device comprising one or more processors and a memory coupled to the one or more processors, the one or more processors configured to execute programmed instructions stored in the memory comprising:
generating and providing one or more driving signals to one or more positioning actuators to move the moveable element towards a target position based on a target travel distance and a calibration value;
determining when a post-movement position of the moveable element is outside of a tolerance range of the target position;
determining when a current position of the moveable element has overshot the target position as the one or more positioning actuators move the moveable element towards the target position;
recalibrating the calibration value when the post-movement position is determined to be outside of the tolerance range;
resetting the target travel distance when the current position is determined to has overshot the target position, wherein the generating and providing is based on the target travel distance after the resetting and the calibration value after the recalibrating; and
repeating the generating, the determining, the determining, the recalibrating and the resetting as open loop steps until the post-movement position is within the tolerance range.

16. The system of claim 15 wherein the one or more processors is further configured to execute programmed instructions stored in the memory further comprising:
determining the target travel distance based on a starting position and the target position; and
determining the calibration value initially based on the determined target travel distance before the generating and providing.

17. The system of claim 15 wherein the one or more processors is further configured to execute programmed instructions stored in the memory further comprising setting a direction of motion based on a starting position and the target position for the moveable element, wherein the generating and providing one or more driving signals is further based on the determined direction of motion.

18. The system of claim 15 wherein the one or more processors is further configured to execute programmed instructions stored in the memory further comprising:

determining a current position of the moveable element as the one or more positioning actuators move the moveable element towards the target position based on the generated one or more driving signals;

determining when the current position has overshot the target position as the one or more positioning actuators move the moveable element towards the target position; and terminating the generating and providing the one or more driving signals when the current position is determined to have overshot the target position.

19. The system of claim 15 wherein the one or more processors is further configured to execute programmed instructions stored in the memory further comprising waiting for a first settling period of time before the determining when the post-movement position of the moveable element is outside of the tolerance range of the target position.

20. The system of claim 15 wherein the one or more processors is further configured to execute programmed instructions stored in the memory for the recalibrating further comprises:

determining when the calibration value after the recalibrating is outside a set operating range;

adjusting a velocity control value when the calibration value after the recalibrating is determined to be outside the set operating range;

readjusting the calibration value after the recalibrating based on the adjusted velocity control value.

21. The system of claim 15 wherein the one or more processors is further configured to execute programmed instructions stored in the memory further comprising terminating the generating and providing when a change limit has been reached.

* * * * *